Figure 1:
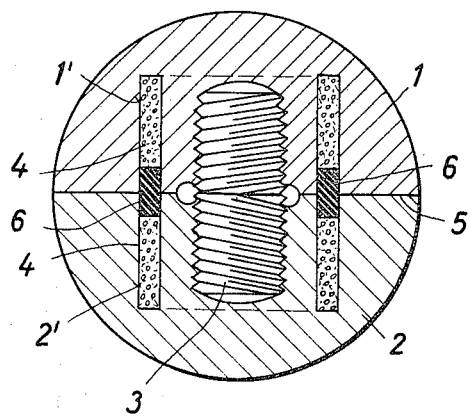

Inventors:
Wilhelm Engel, Werner Cautius
and Kurt Schoen,
By Their Attorney.

Oct. 10, 1967   W. ENGEL ETAL   3,346,462
FUEL ELEMENTS FOR NUCLEAR REACTORS
Filed March 19, 1965   2 Sheets-Sheet 2

Inventors:
Wilhelm Engel, Werner Cautius
and Kurt Schoen,
By
Their Attorney.

3,346,462
FUEL ELEMENTS FOR NUCLEAR REACTORS

Wilhelm Engel, Pfeifferstrasse 56; Werner Cautius, Paul von Hase Strasse 6, both of Dusseldorf, Germany; and Kurt Schoen, Werner-von-Siemensstrasse 11, Meitingen uber Augsburg, Germany
Filed Mar. 19, 1965, Ser. No. 441,060
Claims priority, application Germany, Mar. 25, 1964, A 45,598; Oct. 7, 1964, A 47,268; Feb. 13, 1965, A 48,387
2 Claims. (Cl. 176—67)

The invention relates to nuclear reactor fuel elements of the kind comprising a graphite sphere formed with an inner chamber to receive fissile materials, such as uranium particles with a potting composition; the potting composition may be composed, for instance, of pyrolytic graphite.

As fissile materials there can be considedred more particularly compositions of uranium particles potted e.g. in pyrolytic graphite. The object of the potting is totally to enclose the uranium particles so that the highly radioactive fissile products evolved in nuclear fission cannot pass through the pervious graphite of the spheres into the flow of cooling gas which may be helium. Care must therefore be taken to ensure that the spheres, and therefore, the covering composition, are not damaged when the spheres are introduced into the reactor vessel. Since the spheres experience stresses by free fall when they are introduced into the reactor vessel, they must be able to withstand free fall without damage.

In known fuel elements of this kind, the fissile materials, such as potted uranium particles, are received in chambers disposed centrally within the spheres—i.e., in the core of the spheres. This feature has considerable disadvantages. When the reactor is on full power, the uranium particles embedded at the centre of the sphere become so hot, mainly because of nuclear fission, that they damage the potting composition, with the result that fissile products enter the cooling gas circuit, something which cannot be allowed at any cost. Also, the charge of fissile material may alter in size during irradiation, and such alterations, by leading to the presence of gaps between the charge and the graphite sphere, may further increase the temperature inside the sphere.

Other fuel spheres are formed with a cylindrical gap so disposed that towards the surface of the graphite sphere the top part of the annular gap is closed by a plug flush with the sphere. The potted uranium particles are introduced loosely into such gap. Care must be taken to ensure that no potted particle is outside the cylindrical chamber, for any such particle may be destroyed at assembly. For the sake of good mechanical strength and temperature limitation, the diameter of the cylindrical gap is relatively small, and the gap can receive only relatively small quantities of uranium, nor is there sufficient space available to receive both fuel and a breeder material as, for instance, when the sphere is required to contain uranium 238 and thorium as breeder materials as well as uranium 235.

According to the invention the internal chamber of a nuclear reaction fuel element of the kind described is provided at a position spaced from the centre of the sphere.

The available space is therefore increased and the thermal resistance of the fuel element is so reduced that the temperatures produced in the potting composition at nuclear fission are correspondingly low, with the result that the potting composition is not destroyed. The obviation of a flush termination between the plug and the cylindrical chamber increases mechanical strength and makes filling more reliable than previously.

The previous disadvantages—i.e., rupture of the potting composition by overheating, lack of space for receiving particles, poor mechanical strength of sphere, and uncertain filling are therefore at least partly obviated in a simple manner.

The exact shape and position of the chamber is not critical. Very advantageously, however, the chamber is annular and extends symmetrically around an axis passing through the centre of the sphere. It may then be curved so that it follows the shape of the outer surface of the sphere. To this end, the chamber may have the shape of a double frusto spherical shell, or alternatively have the shape of two frusto cones the larger diameter and of which abut one another at a hemispherical plane of the sphere. Conveniently, in both cases the inner facing ring edges of the fuel-receiving chamber are interrupted. The mechanical strength of the graphite spheres is therefore improved by the elimination of notching actions and there is improved homogeneity of temperature distribution in the spherical shell.

Preferably, the graphite sphere is in the form of two hemispheres which are held together by a screw-threaded connection and which are each formed with an annular recess in register with the recess in the other hemisphere so that the recesses form two parts of the chamber separated by an annular graphite closure plug which is positioned within the chamber at the boundary between the two hemispheres to act as a screen between material in the two parts of the chamber and the boundary. The graphite closure plug which acts as a screen between the chamber—i.e., the fissile materials therein—and the boundary between the graphite hemispheres may alternatively be made of a carbon fibre material. A closure plug of this kind is sufficiently resilient, so that the protective layers or pottings around the fuel are not damaged at assembly of the graphite spheres and the fuel charge can expand when heated in operation without any risk of rupturing the potting composition. Also, since the carbon fibres have a large active superficial area, a closure plug of this kind is highly absorptive in respect of any fissile products leaving the sphere. The carbon fibre materials for the plug may be carbon felts or fabrics or wadding or wool. If made of carbon felt the ring plug is preferably made in a single layer, but if carbon fabrics are used, the ring plug is, advantageously, made of a number of layers. If carbon wool or carbon wadding is used, it is advisable first to tamp the material lightly to give adequate consolidation but without impairing the elasticity or resilience which is desirable for the reasons given.

Some examples of fuel elements constructed in accordance with the invention are shown in central vertical hemispherical section in the accompanying drawings.

The fuel element shown in FIGURE 1 comprises two graphite hemispheres 1, 2 interconnected by a graphite stud 3 formed with two sets of screwthreads, one to each hand. Each hemisphere is formed with its own annular recess 1′, 2′; the recesses 1′, 2′ register with one another and co-operate to give an annular chamber which receives potted uranium particles 4. An annular graphite closure plug 6 acts as a screen between the uranium particles 4 and the boundary 5 between the two hemispheres.

Figure 2:
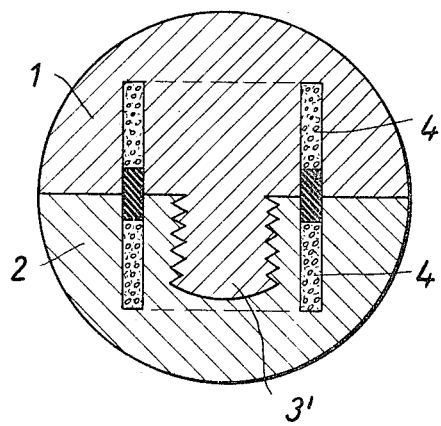

The fuel sphere shown in FIGURE 2 differs from the sphere shown in FIGURE 1 only in that in FIGURE 2 the connecting stud 3′ is formed integrally with one of the two hemispheres 1, 2.

Figure 3:
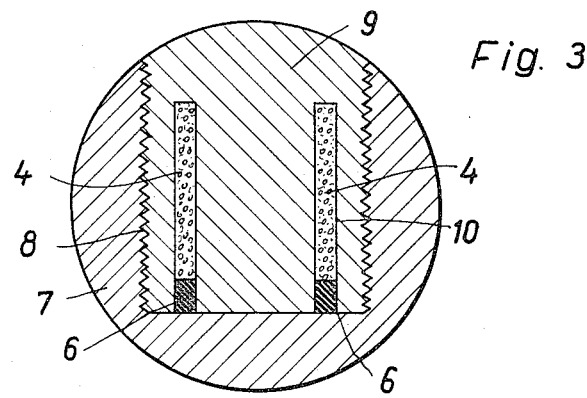

In the example shown in FIGURE 3, an externally screwthreaded graphite plug 9 is screwed into a blind bore 8 in a graphite sphere 7. The plug 9 is formed with an annular chamber 10 which receives the potted fissile particles 4. This example also comprises the annular graphite closure plug 6.

Figure 4:
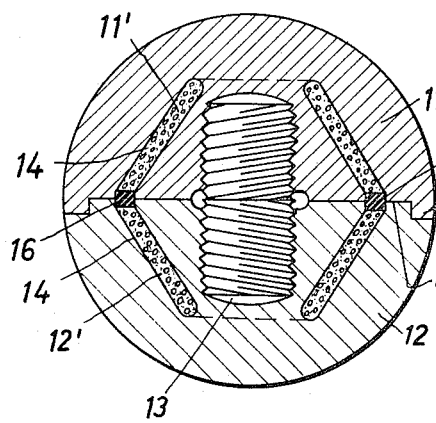

The spherical fuel element shown in FIGURE 4 comprises two graphite hemispheres 11, 12 and a stud 13 formed with two screwthreads, one to each hand. Chambers 11', 12' co-operate to form the generated zone of a two-sided truncated cone the edges of which are interrupted. The double-conical annular chamber receives potted breeder and/or fuel particles 14 which an annular graphite plug 16 seals off from an equatorial boundary 15.

Figure 5:
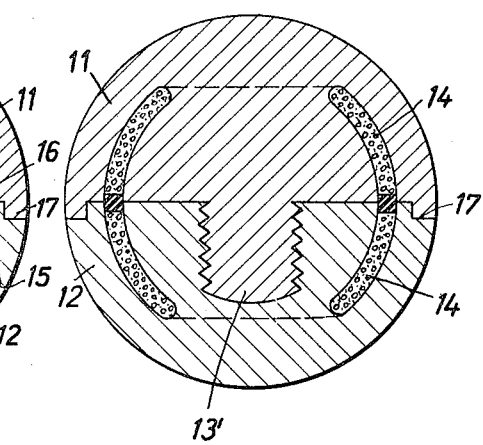

The two graphite hemispheres 11, 12 of the fuel sphere shown in FIGURE 5 are interconnected by a screw-threaded stud 13' which is an integral part of the hemisphere 11. Recesses 11', 12' for receiving breeder and/or fuel particles resemble the flank shell of a spherical zone—i.e., they form an annular "slice" of a spherical shell. To ensure that no continuous gap is left at the boundary between the two hemispheres when the stud 13' becomes very hot, the hemisphere 11 has an annular step 17 which engages in a mating recess at the edge of the hemisphere 12.

Figure 6:
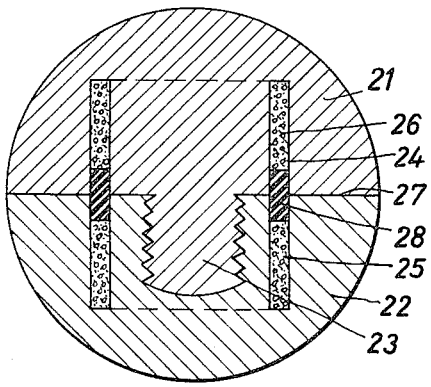

The fuel sphere shown in FIGURE 6 comprises two graphite hemispheres 21, 22 interconnected by a screw-threaded stud 23. The hemispheres are formed with annular recesses 24, 25 which register with one another and which co-operate to give a chamber receiving potted uranium particles 26. An annular plug 28 made of a carbon fibre material acts as a screen between the particles 26 and a boundary 27 between the two hemispheres 21, 22.

An annular plug 28 of this kind can also be used satisfactorily with other kinds of multi-part fuel elements, more particularly those of the kind shown in FIGURES 4 and 5 where the fuel chamber in shape resembles the generated surface of a double frusto, or an annular "slice" of a spherical shell. When used in association with the latter kinds of construction the annular plug 28 is adapted in cross-section to the particular kind of fuel chamber used.

We claim:
1. A nuclear reactor fuel element comprising a graphite sphere defining near the external surface an annular chamber formed about a central axis of the sphere, potted fissile material disposed in said chamber, the remainder of the sphere throughout being free from any of said potted fissile material, said graphite sphere being in the form of two hemispheres which are held together by a screw-threaded connection, said chamber comprising an annular recess formed in each hemisphere in register with the recess in the other hemisphere, and an annular graphite closure plug positioned within the chamber at the boundary between the two hemispheres operable to act as a screen between the fissile material in the two parts of the chamber and the boundary.

2. An element according to claim 1, in which the two hemispheres are interconnected by a graphite stud formed at its ends with screwthreads of opposite hands, one end of the stud screwing into a tapped bore in one hemisphere and the other end of the stud screwing into a tapped bore in the other hemisphere.

References Cited

UNITED STATES PATENTS

| 3,079,316 | 2/1963 | Johnson | 176—90 X |
| 3,142,626 | 7/1964 | Wellborn | 176—90 X |
| 3,151,037 | 9/1964 | Johnson et al. | 176—67 |
| 3,158,547 | 11/1964 | Smith | 176—90 X |
| 3,166,614 | 1/1965 | Taylor | 176—91 |
| 3,284,314 | 11/1966 | Rachor | 176—90 X |

FOREIGN PATENTS

| 621,315 | 5/1961 | Canada. |
| 1,320,338 | 1/1963 | France. |

OTHER REFERENCES

Nuclear Power, March 1961, p. 84.

BENJAMIN R. PADGETT, *Primary Examiner.*

M. J. SCOLNICK, *Assistant Examiner.*